(12) United States Patent
Goverdhan et al.

(10) Patent No.: US 10,583,913 B2
(45) Date of Patent: Mar. 10, 2020

(54) STUD PUSH OUT MOUNT FOR A TURBINE ENGINE SPINNER ASSEMBLY HAVING A SPINNER PUSH OUT STUD JOINT CONNECTING THROUGH A COUNTERBORE OF A SPINNER BOLT HOLE

(71) Applicant: General Electric Company, Schenectady, NY (US)

(72) Inventors: Abhishek Goverdhan, Karnataka (IN); Ravindra Shankar Ganiger, Karnataka (IN); Richa Awasthi, Karnataka (IN); Viswanadha Gupta Sakala, Karnataka (IN); Vidya Lokammanahalli Shivashankar, Karnattaka (IN)

(73) Assignee: General Electric Company, Schenectady, NY (US)

( * ) Notice: Subject to any disclaimer, the term of this patent is extended or adjusted under 35 U.S.C. 154(b) by 381 days.

(21) Appl. No.: 15/458,354

(22) Filed: Mar. 14, 2017

(65) Prior Publication Data
US 2018/0265181 A1    Sep. 20, 2018

(51) Int. Cl.
*B64C 11/14* (2006.01)
*F02C 7/04* (2006.01)
(Continued)

(52) U.S. Cl.
CPC .............. *B64C 11/14* (2013.01); *B64D 27/10* (2013.01); *F02C 7/04* (2013.01);
(Continued)

(58) Field of Classification Search
CPC ...... B64C 11/14; F02C 7/04; F05D 2250/121; F05D 2260/31; F16B 5/0275
(Continued)

(56) References Cited

U.S. PATENT DOCUMENTS 1,978,039 A * 10/1934 Caldwell ................ B64C 11/14
                                                  416/245 R
2,401,247 A *  5/1946 Hunter .................... B64C 11/14
                                                  244/134 A
(Continued)

FOREIGN PATENT DOCUMENTS

EP    2 221 247 A2    8/2010
EP    2 096 029 A3    5/2012
(Continued)

*Primary Examiner* — Devon C Kramer
*Assistant Examiner* — Benjamin Doyle
(74) *Attorney, Agent, or Firm* — General Electric; Pamela Kachur

(57) ABSTRACT

An aircraft spinner assembly includes collar stud joints connecting spinner to forward flange connected to fan rotor disk. Collar stud joint is operable to push out spinner when stud is un-torqued. Collar may be attached to stud disposed through spinner bolt hole in spinner and collar disposed in counterbore of spinner bolt hole. An aft stud thread on collar stud may be threaded into aft nut which may be swaged into flange bolt hole in forward flange. A washer may be in counterbore between collar and spinner and made from low friction and/or sacrificial material. A forward radial clearance may surround stud between stud and spinner. A forward nut may be threaded onto forward stud threads on forward end of the collar stud and abut spinner. External aft stud threads may be on collar studs and threaded into internal flange threads within flange bolt holes in forward flange.

32 Claims, 9 Drawing Sheets

(51) Int. Cl.
*B64D 27/10* (2006.01)
*F16B 5/02* (2006.01)

(52) U.S. Cl.
CPC .... *F05D 2250/121* (2013.01); *F05D 2260/31* (2013.01); *F16B 5/0275* (2013.01)

(58) Field of Classification Search
USPC ...................................... 416/245 R; 411/389
See application file for complete search history.

(56) References Cited

U.S. PATENT DOCUMENTS

| | | | | |
|---|---|---|---|---|
| 3,897,713 | A * | 8/1975 | Gugle | F16B 5/0275 411/389 |
| 4,157,674 | A | 6/1979 | Carlson et al. | |
| 4,186,645 | A * | 2/1980 | Zaydel | B60Q 1/2607 138/89 |
| 4,316,675 | A | 2/1982 | Melicque | |
| 4,690,365 | A * | 9/1987 | Miller | F16B 5/0233 248/188.4 |
| 4,863,354 | A | 9/1989 | Asselin et al. | |
| 5,333,978 | A * | 8/1994 | Rives | B60Q 1/0433 411/369 |
| 5,511,760 | A * | 4/1996 | Kambara | F16M 7/00 248/188.4 |
| 5,573,378 | A * | 11/1996 | Barcza | B64C 11/14 411/175 |
| 6,158,310 | A * | 12/2000 | Goss | B25B 13/065 81/121.1 |
| 6,416,280 | B1 | 7/2002 | Forrester et al. | |
| 6,447,255 | B1 * | 9/2002 | Bagnall | F01D 5/066 277/626 |
| 6,843,629 | B2 | 1/2005 | Farral | F16B 37/125 411/178 |
| 7,241,097 | B2 * | 7/2007 | Dembowsky | F16B 5/0233 411/34 |
| 7,303,377 | B2 | 12/2007 | Rockarts et al. | |
| 7,306,432 | B2 | 12/2007 | Rockarts et al. | |
| 8,033,703 | B2 * | 10/2011 | Bryce | F16B 19/02 362/549 |
| 8,353,937 | B2 * | 1/2013 | Capote | A61B 17/7032 606/246 |
| 8,425,197 | B2 | 4/2013 | Breakwell | |
| 9,284,842 | B2 | 3/2016 | Lombard et al. | |
| 10,309,435 | B2 * | 6/2019 | Couto Maquieira | F16B 5/0233 |
| 2003/0017025 | A1 * | 1/2003 | Wojciechowski | B23P 19/062 411/107 |
| 2003/0118399 | A1 * | 6/2003 | Schilling | F16B 5/0275 403/337 |
| 2004/0161339 | A1 * | 8/2004 | Breakwell | B64C 11/14 416/245 R |
| 2004/0258522 | A1 * | 12/2004 | Dix | F01D 5/066 416/94 |
| 2008/0310933 | A1 * | 12/2008 | Ricciardo | F16B 39/10 411/161 |
| 2010/0051112 | A1 * | 3/2010 | Dieling | F02C 7/04 137/15.1 |
| 2011/0103726 | A1 * | 5/2011 | Xie | F01D 5/06 384/295 |
| 2013/0202449 | A1 * | 8/2013 | Lombard | F01D 5/02 416/244 R |
| 2014/0186166 | A1 * | 7/2014 | Kostka | F01D 5/143 415/182.1 |
| 2014/0212295 | A1 | 7/2014 | Kray et al. | |
| 2014/0255203 | A1 * | 9/2014 | Roby | B64C 27/54 416/245 R |
| 2014/0301804 | A1 | 10/2014 | Spolyar | |
| 2017/0114800 | A1 * | 4/2017 | Burkholder | F04D 29/329 |
| 2017/0298977 | A1 * | 10/2017 | Knobloch | F01D 25/243 |
| 2018/0245513 | A1 * | 8/2018 | Servant | F02C 7/04 |

FOREIGN PATENT DOCUMENTS

| | | |
|---|---|---|
| GB | 2 363 170 A | 12/2001 |
| GB | 2 364 748 A | 2/2002 |

* cited by examiner

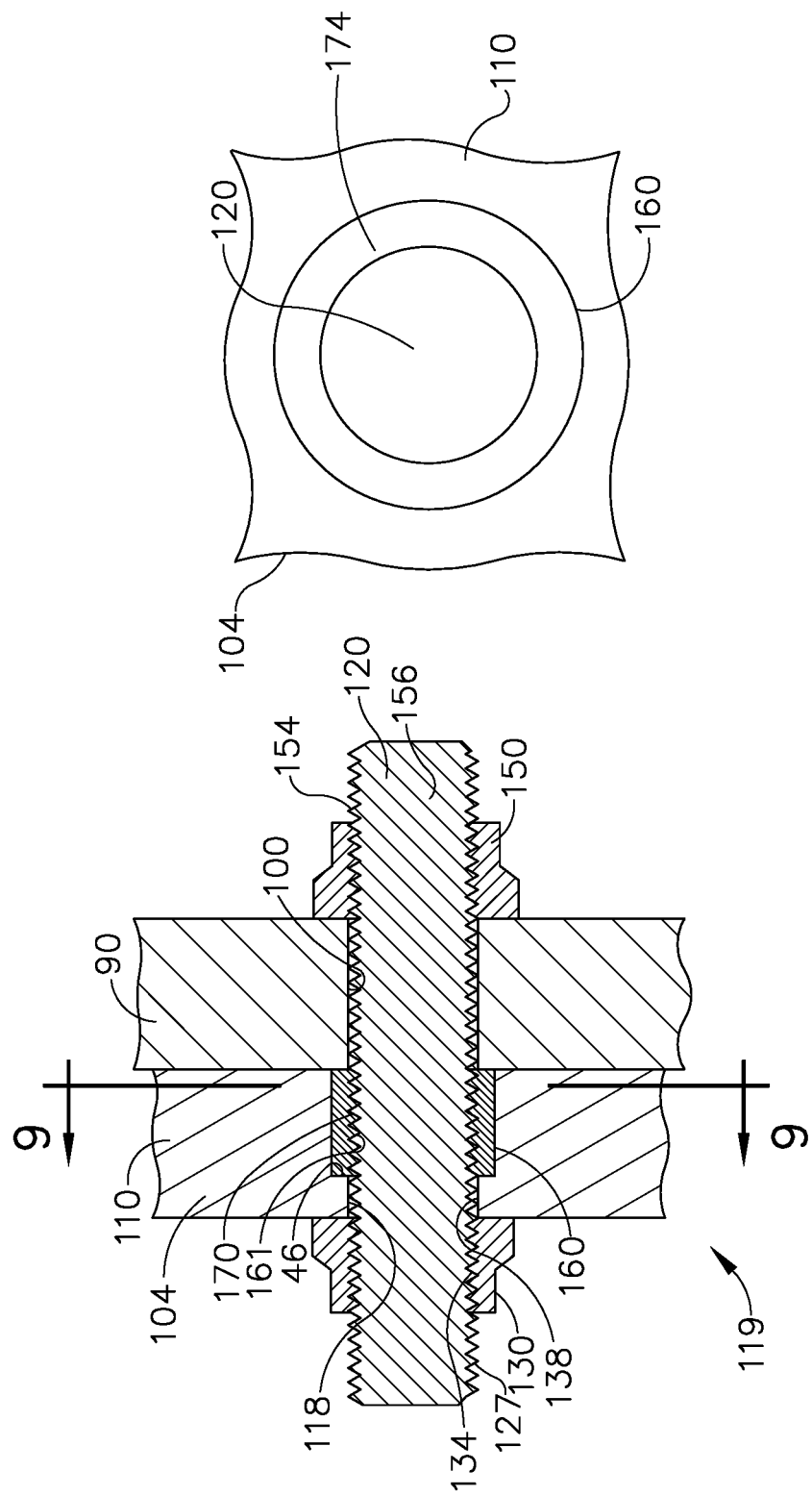

STUD PUSH OUT MOUNT FOR A TURBINE ENGINE SPINNER ASSEMBLY HAVING A SPINNER PUSH OUT STUD JOINT CONNECTING THROUGH A COUNTERBORE OF A SPINNER BOLT HOLE

BACKGROUND OF THE INVENTION

Field of the Invention

The present invention relates generally to spinners for gas turbine engine fan assemblies and, more specifically, to mounting the spinners to fan rotors.

Description of Related Art

Aircraft turbofan gas turbine engines include a fan assembly having a plurality of circumferentially spaced apart fan blades extending radially outwardly from a rotor disk. Ambient airflow is channeled between the blades and pressurized thereby generating thrust for powering the aircraft in flight. The fan assembly typically includes a plurality of circumferentially spaced apart fan blades each having a dovetail root disposed in a complementary axially extending dovetail groove or slot in a perimeter or rim of a rotor disk or drum. A spinner is mounted to a front end of the fan assembly to provide smooth airflow into the fan as illustrated in U.S. Pat. No. 6,416,280, by Forrester et al., entitled "One Piece Spinner", which issued Jul. 9, 2002, is assigned to the present assignee, the General Electric Company, and which is incorporated herein by reference.

Some spinners are one piece spinners that attach directly to the disk post and some spinners are two piece spinners that have an upper portion of the spinner attached to a flange extending axially forwardly from a disk and a lower portion of the spinner attached to the upper portion of the spinner. This upper portion of the spinner is referred to as a spinner support.

Current methods and attachment of the spinner to the spinner support incorporate bolts. Spinner disassembly method requires jack-screw removal and a scallop method requires a special tool. There is a high risk of spinner surface damage if an incorrect tool is used. This tool is often required to be shipped along with the spinner to avoid mishandling.

Jack-screws require inserts which if damaged then require a jack-screw hole size to be increased. The jack-screw uses a jack-screw Chances wound spring insert which can be released into the flowpath. Jack-screws manufacturers recommend a back spot face on the mating part to offset the inevitable high metal spallings generated from the screw itself.

It is highly desirable to avoid expensive methods and designs for attaching the spinner to the spinner support. It is desirable to avoid spinner designs and disassembly methods using jack-screw removal and a scallop method requiring special tool. It is desirable to avoid even the chance of damaging the spinner and/or spinner support assembly during spinner disassembly.

SUMMARY OF THE INVENTION

An aircraft gas turbine engine spinner assembly includes spinner push out stud joints connecting a spinner to a forward flange connected to a fan rotor disk, a radially inner flange spaced radially inwardly of a hollow shell of the spinner and disposed in a flange bore within the forward flange, and threaded studs operable for securing the spinner to the forward flange and pushing out the spinner from the flange bore and away from the flange when the threaded studs are un-torqued.

The spinner push out stud joints may be collar stud joints and the threaded studs collar studs. Each of the collar stud joints includes a collar attached to and surrounding the collar stud which is disposed through a spinner bolt hole in the spinner, and the collar is disposed in a counterbore of the spinner bolt hole extending axially forward into the spinner.

An aft stud thread may be on the collar stud and threaded into an aft nut in the forward flange. The aft nut may be swaged into a flange bolt hole in the forward flange. A multifaceted head may be on or a key hole may be through a forward end of the collar stud. A washer may be disposed in the counterbore between the collar and the spinner wherein the washer may be made from a low friction and/or sacrificial material.

A forward radial clearance may surround the stud between the stud and the spinner. A forward nut may threaded onto forward stud threads on a forward end of the collar stud and abutting the spinner. External aft stud threads may be on the collar studs and threaded into internal flange threads within the flange bolt holes in the forward flange. An aft nut may be threaded onto external aft stud threads on the collar studs with the aft nut abutting the forward flange around the flange bolt holes.

The assembly may include forward and aft radial clearances surrounding the stud between the stud and the spinner in the spinner bolt hole and between the stud and the forward flange in the flange bolt holes respectively.

The collar stud joints may include an internally threaded sleeve threaded on the collar stud, the collar including a head of the sleeve, and internal threads of the sleeve threaded onto mid-span external threads on the collar stud. The head of the threaded sleeve may be square and sized for providing anti-rotation for the collar.

At least one of the collar stud joints may include different forward and aft shank diameters along forward and aft portions respectfully of the collar stud. The forward portion may aftwardly extend from a forward end of the collar stud through the spinner and the aft portion may aftwardly extend from the forward portion through the forward flange. The forward shank diameter may be smaller than the aft shank diameter.

The assembly may include each of the collar stud joints having an internally threaded sleeve threaded on the collar stud, the collar including a head of the sleeve, and internal threads of the sleeve threaded onto mid-span external threads on the collar stud.

Each of the collar stud joints may include a shank disposed through a spinner bolt hole extending through the spinner, an internally threaded collar at an aft end of the shank, a joint bolt having a joint shank disposed through a flange bolt hole in the forward flange, aft stud threads on the joint shank and threaded into internal collar threads in the internally threaded collar, and a shank head at an aft end of the shank pressing against the forward flange around the flange bolt hole.

The spinner bolt hole may extend through a boss of the spinner.

The spinner push out stud joints may be collar stud joints and the threaded studs collar studs and each of the threaded collar studs a stepped stud with a shank having different forward and aft shank diameters along forward and aft portions of the shank. A collar surrounds an aft end of the forward portion or surrounds and is attached to an aft end of the forward portion which is disposed through a spinner bolt hole in the spinner. The collar is disposed in a counterbore of the spinner bolt hole extending axially forward into the spinner.

An aft stud thread may be on the collar stud threaded into an aft nut in the forward flange and a washer may be disposed in the counterbore between the collar and the spinner wherein the washer is made from a low friction and/or sacrificial material.

The assembly may further include the threaded studs disposed through a spinner bolt hole in the spinner and through a flange bolt hole in the forward flange and an annular internally threaded sleeve threaded onto each of the threaded studs and disposed through the spinner bolt hole in the spinner. The threaded sleeve may include internal threads threaded onto mid-span external threads on the threaded stud and the internal threads threaded in an opposite direction to that of the forward and aft stud threads.

BRIEF DESCRIPTION OF THE DRAWINGS

The foregoing aspects and other features of the invention are explained in the following description, taken in connection with the accompanying drawings where:

FIG. 8 is a cross-sectional diagrammatical view illustration of a counter threaded sleeve for use in the spinner push out stud joint illustrated in FIG. 1.

FIG. 9 is a cross-sectional diagrammatical view illustration of the sleeve of the joint through 9-9 in FIG. 8.

DETAILED DESCRIPTION OF THE INVENTION

Figure 1:
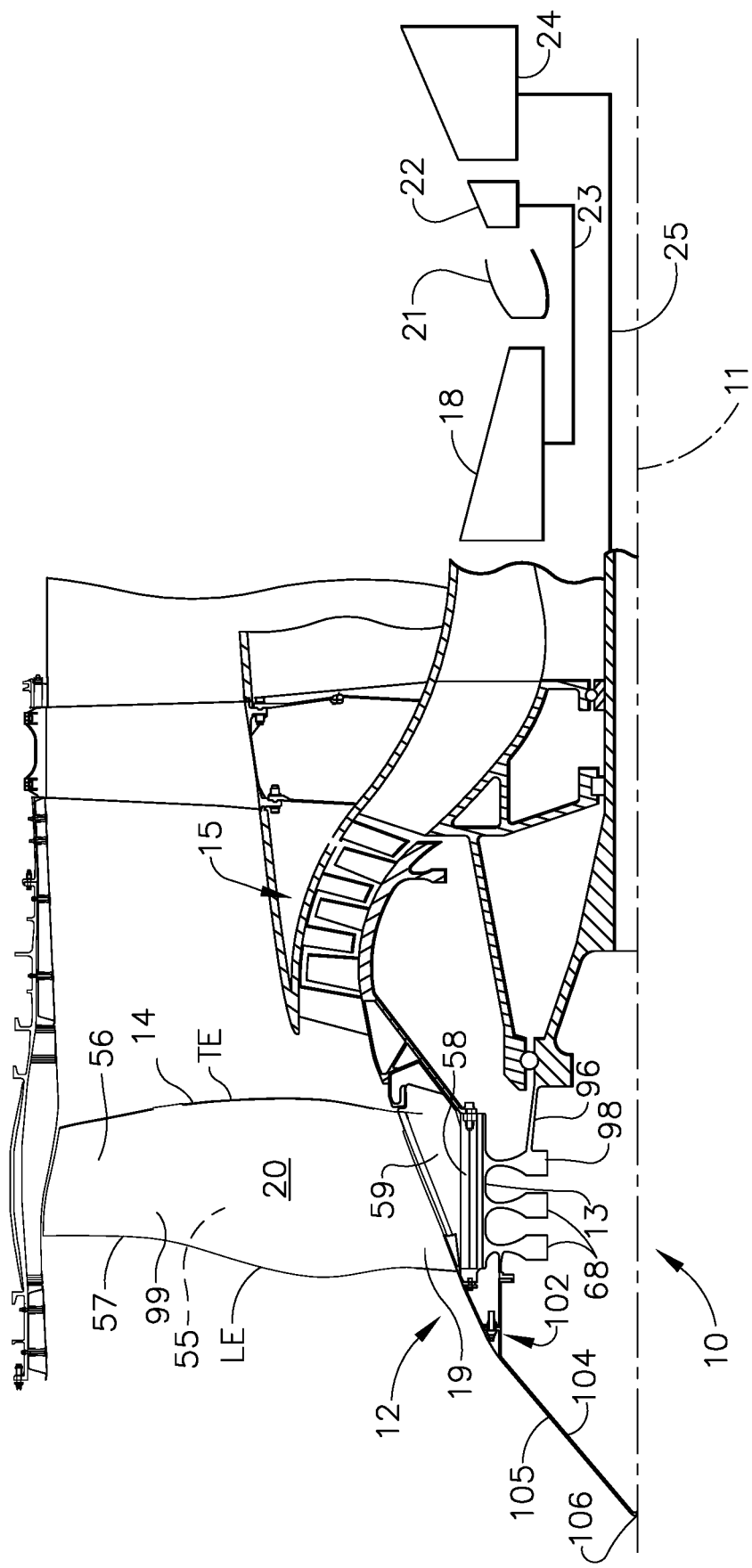
FIG. 1 is a longitudinal part sectional and part diagrammatical view illustration of an exemplary embodiment of an aircraft turbofan gas turbine engine having spinner push out stud joints attaching a spinner to a spinner support.

Illustrated in FIG. 1 is an exemplary aircraft turbofan gas turbine engine 10 circumscribed about an engine centerline axis 11 and suitably designed to be mounted to a wing or fuselage of an aircraft. The engine 10 includes, in downstream serial flow communication, a fan 14, a booster or a low pressure compressor 15, a high pressure compressor 18, a combustor 21, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 15.

Figure 2:
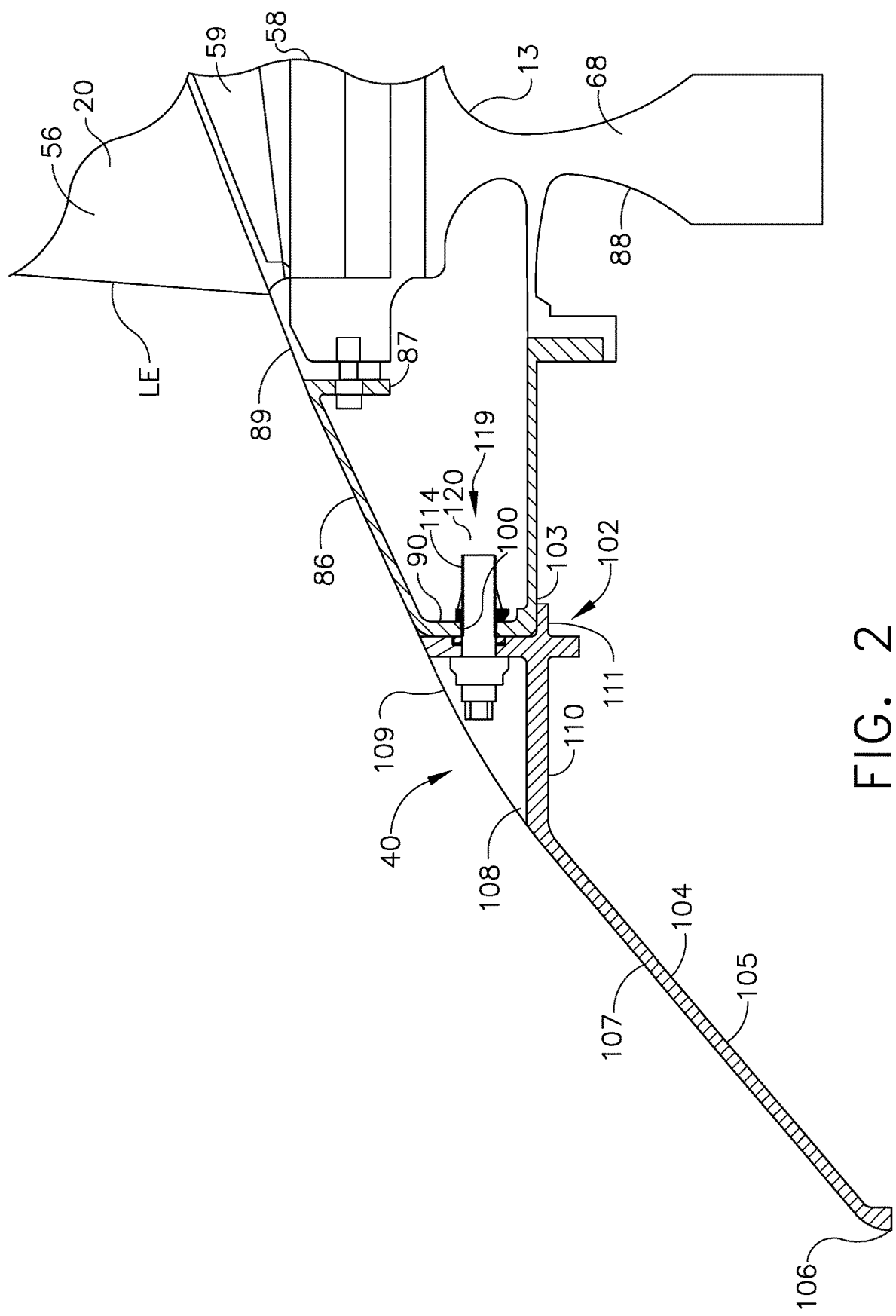
FIG. 2 is an enlarged cross-sectional view illustration of the spinner bolted to the spinner with the a spinner push out stud joint illustrated in FIG. 1.

Referring to FIGS. 1 and 2, the fan 14 is part of a fan assembly 12 including a fan rotor disk 13 (or drum) from which extends radially outwardly a single axially located row 19 of circumferentially spaced apart fan blades 20. Each of the fan blades 20 includes an airfoil section 56 with airfoil pressure and suction sides 55, 57 extending between axially spaced apart airfoil leading and trailing edges LE, TE, respectively. The airfoil section 56 is attached to a dovetail root 58 by a blade shank 59.

An annular forward extension flange 86 (a cylindrical annular forward extension exemplified herein) has an annular forward flange 90 and an annular aft extension flange 87 bolted or otherwise attached to an annular forward arm 89 extending forward from a forwardmost one 88 of the webs 68 of the disk 13. Alternate embodiments include the forward extension flange 86 being integrally formed or cast with an extending forward from the forwardmost one 88 of the webs 68 of the disk 13. An annular aft arm 96 (a conical annular aft arm exemplified herein) extends axially aftwardly from and is integrally formed or cast with an aftwardmost one 98 of the webs 68 of the disk 13 and is connected to the low pressure drive shaft 25.

Referring to FIG. 2, the forward flange 90 includes a plurality of circumferentially distributed flange bolt holes 100. A spinner assembly 40 includes a spinner 104 attached to the forward flange 90 of the forward extension flange 86 and, thus, connected to the disk 13. The forward flange 90 is also referred to as an aft support ring (ASR) designed to support the spinner 104. The spinner 104, as illustrated in the exemplary embodiment of the spinner assembly 40 illustrated herein, has a hollow shell 105 which may have a substantially conical shape and, as illustrated herein, may be a single piece spinner. The spinner 104 has a tip 106 from which a forward conical section 107 extends aftwardly to transition section 108. An aft conical section 109 extends aftwardly from the transition section 108. The forward and aft conical sections 107, 109 have different cone angles.

The spinner 104 is bolted or otherwise threadingly connected to the forward flange 90 or aft support ring (ASR). The spinner 104 or bosses 110 of the spinner 104 include a radially inner flange 111 spaced radially inwardly of the hollow shell 105. The inner flange 111 fits firmly in a flange bore 103 within the forward flange 90. Exemplary embodiments of the inner flange 111 and the flange bore 103 are cylindrical and circumscribed about the engine centerline axis 11. Spinner push out stud joints 102 include threaded studs 114 used for securing the spinner 104 to the forward flange 90 or aft support ring (ASR) and pushing out the spinner 104 from the flange bore 103 and away from the flange 90 when the threaded studs 114 are un-torqued.

Figure 3:
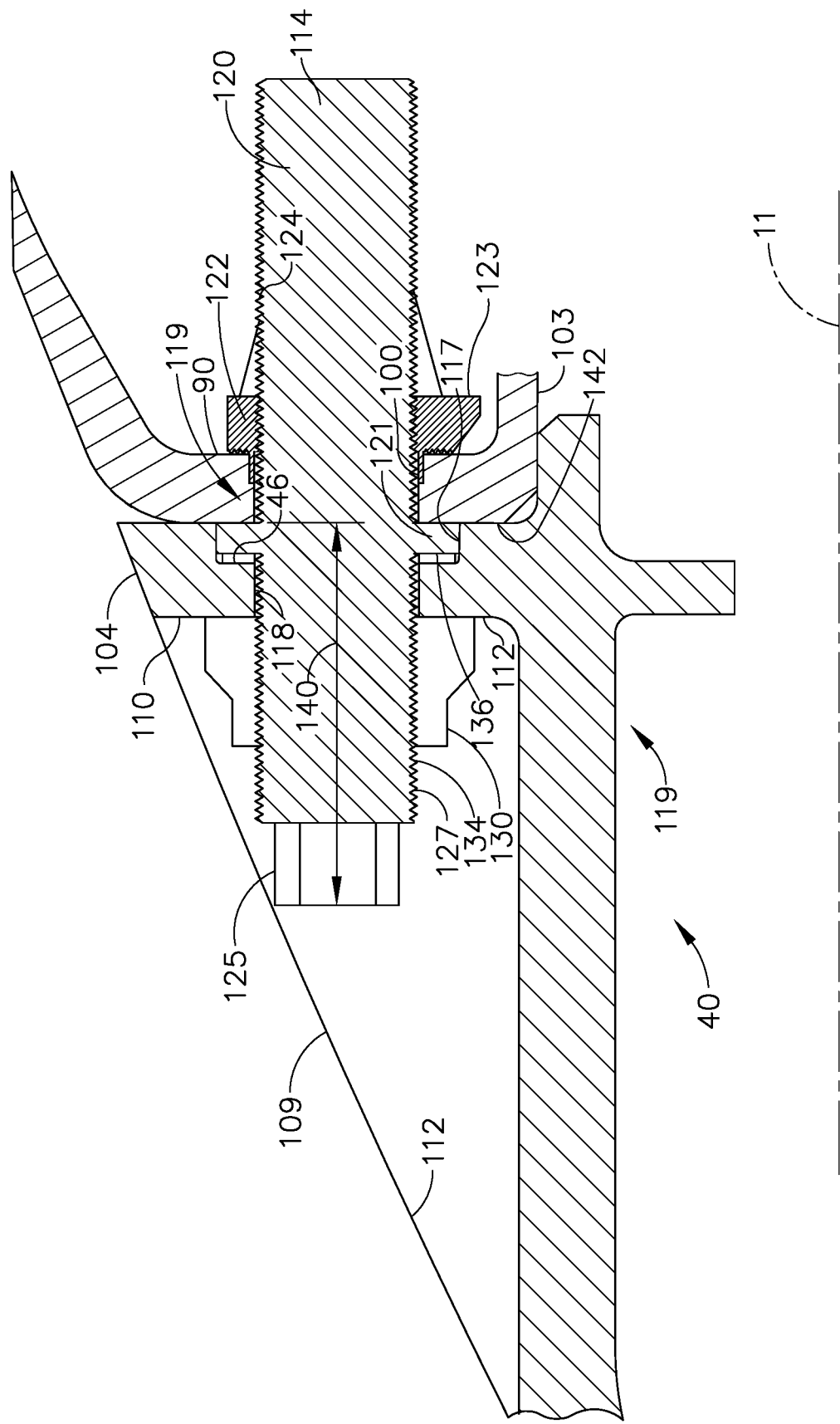
FIG. 3 is an enlarged cross-sectional diagrammatical view illustration of the collar stud in the spinner push out stud joint illustrated in FIG. 2.

Referring to FIGS. 2 and 3, a plurality of bosses 110 are circumferentially distributed around an inner surface 112 of the spinner 104 illustrated herein at an axial location generally corresponding to a location within the transition section 108 between the forward and aft conical sections 107, 109 of the spinner 104. Spinner bolt holes 118 extend through the spinner 104 and in the exemplary embodiment of the spinner assembly 40 illustrated herein through each of the bosses 110. A plurality of counterbores 117 of the spinner bolt holes 118 extend axially forward into the bosses 110 and are axially adjacent, forward of, and co-axial with the spinner bolt holes 118 in the spinner 104. Each of the counterbores 117 and corresponding ones of the spinner bolt holes 118 extend axially parallel to the centerline axis 11 through the spinner 104 and each of the bosses 110. Annular shoulders 46 extend radially between the counterbores 117 and the spinner bolt holes 118. Spinner push out stud joints 102 include threaded collar studs 120 used for securing the spinner 104 to the forward flange 90 or aft support ring (ASR) and pushing out the spinner 104 out of the flange bore 103 and away from the flange 90 when the threaded collar studs 120 are un-torqued.

The embodiment of the spinner push out stud joints 102, illustrated in FIGS. 2 and 3 is a collar stud joint 119. The collar stud joint 119 includes threaded collar studs 120 disposed through spinner bolt holes 118 and threaded into aft nuts 122 in the annular forward flange 90 with aft stud threads 124 on the collar studs 120. Collars 121 are attached to and surround the collar studs 120. The aft nuts 122 are shank nuts which provide anti-rotation for the aft nuts 122 which are swaged into the flange bolt holes 100 in the forward flange 90. The aft nuts 122 may be D-head nuts 123 swaged into the flange bolt holes 100 in the annular forward flange 90 as in the embodiment illustrated in FIG. 3. The collar studs 120 may have multifaceted heads 125, such as hex heads, on forward ends 127 of the collar studs 120 which may be used to torque and rotate the studs 120 when threading the studs 120 into the aft nuts 122. Forward nuts 130 are threaded onto forward stud threads 134 on the collar studs 120 and abut and engage the spinner 104 and, more particularly, the bosses 110 of the spinner 104. This secures the spinner 104 to the annular forward flange 90 and the disk 13.

The collars 121 are attached to and surround the collar studs 120. The collars 121 seat within the counterbores 117 between the bosses 110 and the forward flange 90. The collars 121 may be located around mid-length 140 of the collar studs 120. In the assembled condition, the collars 121 abut against and aft flange face 142 of the forward flange 90 or aft support ring (ASR). During disassembly of the spinner 104 from the ASR, the studs 120 are unthreaded from the forward flange 90 or aft support ring (ASR) and the collars 121 push against the annular shoulder 46 between the counterbore 117 and the spinner bolt holes 118 in the spinner boss 110 of the spinner 104. This pulls the spinner 104 out of the flange bore 103 and away from the forward flange 90 and the disk 13.

A washer 136 may be disposed in the counterbore 117 between the collar 121 and the boss 110 on the spinner 104. The washer 136 may be made from a low friction and/or sacrificial material to prevent or reduce surface wear during disassembly. A forward radial clearance 138 may surround each of the studs 120 between the studs and the bosses 110 of the spinner 104.

Figure 4:
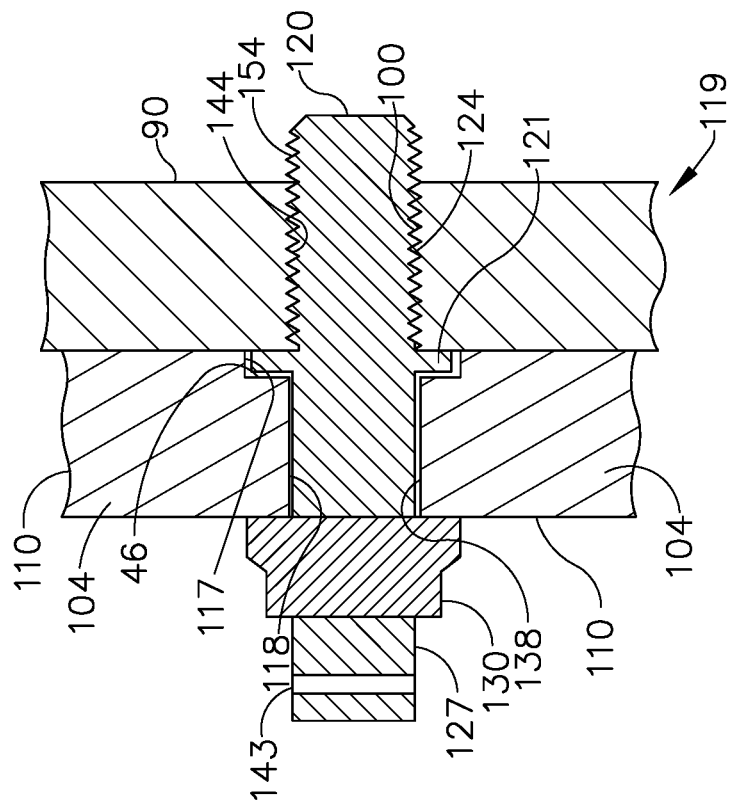
FIG. 4 is a cross-sectional diagrammatical view illustration of a key hole through the collar stud of the joint illustrated in FIG. 2.

FIG. 4 illustrates another embodiment of the collar stud joint 119 which uses a key hole 143 instead of the multifaceted head 125, illustrated in FIG. 3, on the forward end 127 of the stud 120 to torque and rotate the stud 120 when threading the stud 120. FIG. 4 also illustrates a collar stud joint 119 in which external aft stud threads 124 on the collar studs 120 are threaded into internal flange threads 144 within the flange bolt holes 100 in the forward flange 90.

Figure 5:
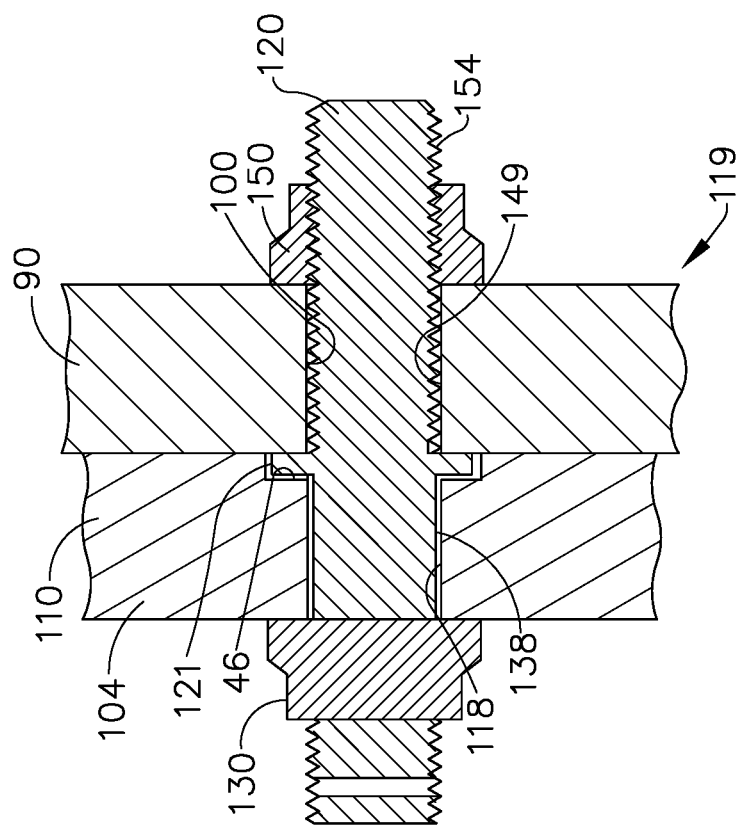
FIG. 5 is a diagrammatical cross-sectional view illustration of an aft nut threaded onto external aft stud threads on the collar stud of the joint illustrated in FIG. 1.

FIG. 5 illustrates an embodiment of the collar stud joint 119 which incorporates aft nuts 150 threaded onto aft stud threads 154 on aft ends 156 of the collar studs 120. The aft nuts 150 abut and engage the forward flange 90 around the flange bolt holes 100. A key hole 143 on the forward end 127 of the stud 120 is used to torque and rotate the stud 120 when threading the stud 120 into the aft nuts 150. Forward and aft radial clearances 138, 149 may surround each of the studs 120 between the studs and the bosses 110 of the spinner 104 in the spinner bolt holes 118 and between the studs and the forward flange 90 in the flange bolt holes 100 respectively.

Figure 7:
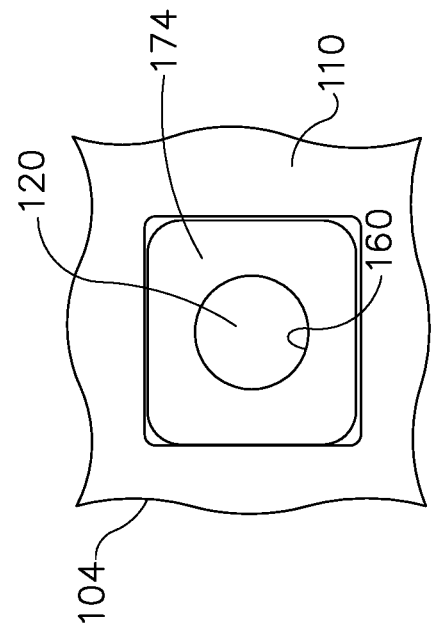
FIG. 7 is a cross-sectional diagrammatical view illustration of the sleeve of the joint through 7-7 in FIG. 6.
Figure 6:
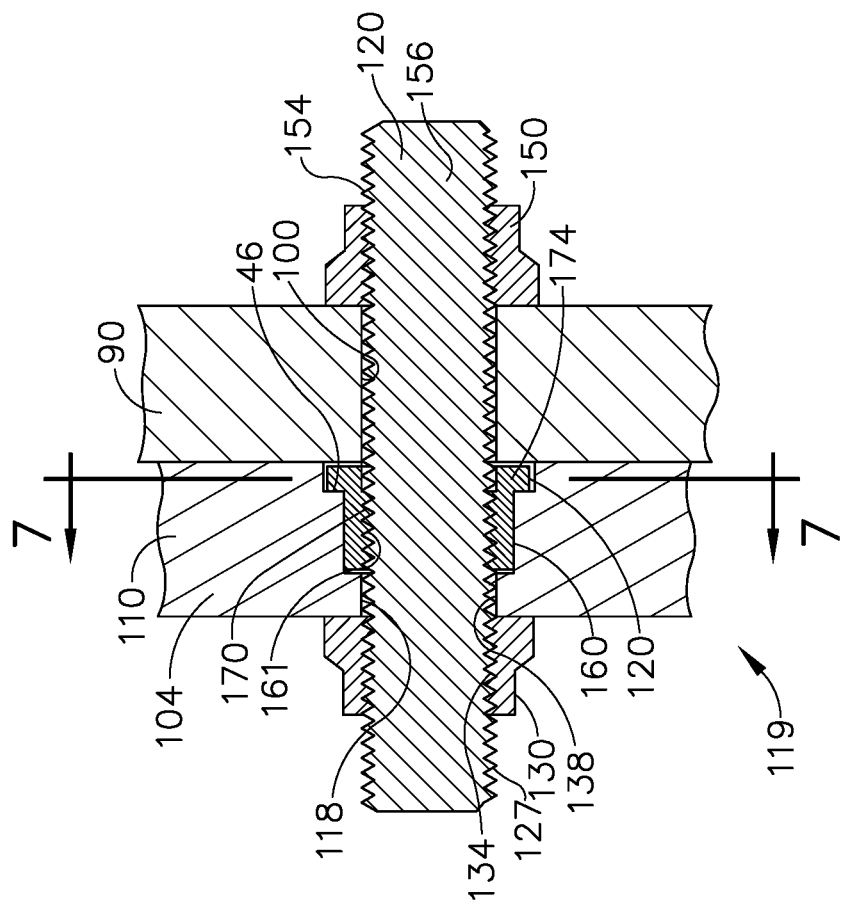
FIG. 6 is a diagrammatical cross-sectional view illustration of the spinner push out stud joint illustrated in FIG. 1 with a collar on a threaded sleeve.

FIGS. 6 and 7 illustrate an embodiment of the collar stud joint 119 which incorporates an internally threaded sleeve 160 threaded on the collar stud 120. The sleeve 160 includes a head 174 that may be integrally formed with the sleeve 160. The head 174 serves as the collar 121 attached to and surrounding the collar stud 120. The head 174 of the threaded sleeve 160 may be square to provide anti-rotation for the collar 121. The threaded sleeve 160 includes internal threads 161 which are threaded onto mid-span external threads 170 on the collar studs 120. Forward and aft nuts 130, 150 are threaded onto forward and aft stud threads 134, 154 on forward and aft ends 127, 156 of the collar studs 120. The forward nut 130 abuts and engages the spinner 104 and, more particularly, the bosses 110 of the spinner 104. The aft nut 150 abuts and engages the forward flange 90 around the flange bolt holes 100. A forward radial clearance 138 may surround the collar stud 120 between the stud and the boss 110 of the spinner 104.

FIGS. 8 and 9 illustrate another exemplary embodiment of the spinner push out stud joint 102 which incorporates an annular internally threaded sleeve 160 without a collar 121. The threaded sleeve 160 is threaded in an opposite direction to that of forward and aft ends 127, 156 of the threaded stud 114 located forward and aft of the boss 110 of the spinner 104. The threaded sleeve 160 includes internal threads 161 threaded onto mid-span external threads 170 on the threaded stud 114. The internal threads 161 are threaded in an opposite direction to that of the forward and aft stud threads 134, 154 on forward and aft ends 127, 156 of the collar studs 120. This counter torquing and threading of the internal threads 161 and the forward and aft stud threads 134, 154 provides anti-rotation for the collar 121 and pushing out the spinner 104 from the flange bore 103 and away from the flange 90 when the threaded collar studs 120 are un-torqued.

Forward and aft nuts 130, 150 are threaded onto forward and aft stud threads 134, 154 on forward and aft ends 127, 156 of the collar studs 120. The forward and aft stud threads 134, 154 are on the forward and aft ends 127, 156 of the collar studs 120. The forward nut 130 abuts and engages the spinner 104 and, more particularly, the bosses 110 of the spinner 104. The aft nut 150 abuts and engages the forward flange 90 around the flange bolt holes 100. A forward radial clearance 138 may surround the threaded sleeve 160 between the sleeve and the boss 110 of the spinner 104.

Figure 10:
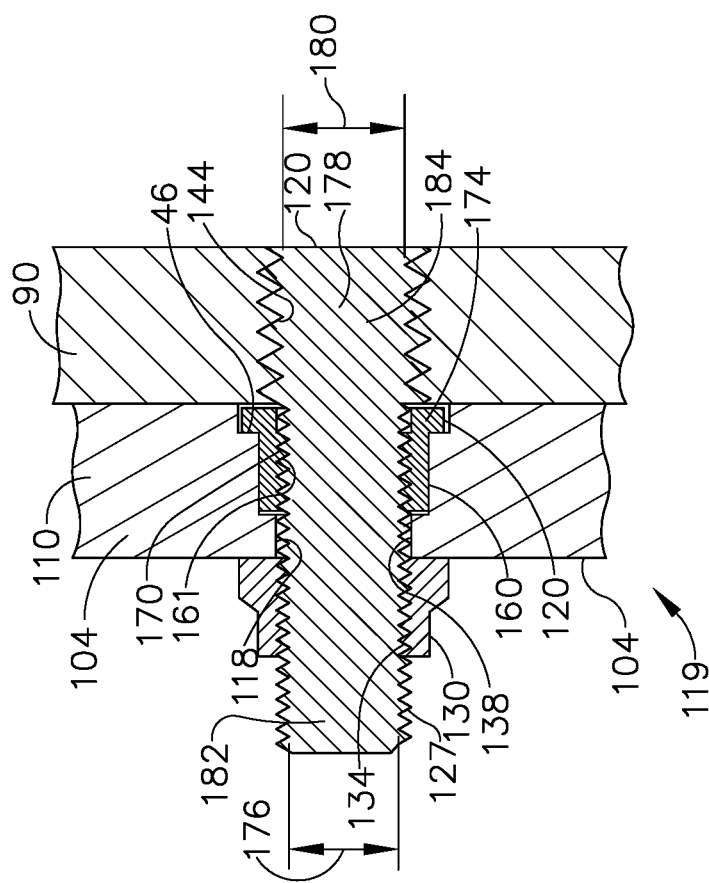
FIG. 10 is a cross-sectional diagrammatical view illustration of the spinner push out stud joint as illustrated in FIG. 1 with a variable shank diameter collar stud.

FIG. 10 illustrates an embodiment of the collar stud joint 119 including a variable forward shank diameter 176. A shank 178 of the collar stud 120 has different forward and aft shank diameters 176, 180 along forward and aft portions 182, 184 of the collar stud 120. The forward portion 182 aftwardly extends from the forward end 127 of the collar stud 120 through the boss 110 and the spinner 104. The aft portion 184 aftwardly extends from the forward portion 182 of the collar stud 120 through the forward flange 90. The forward shank diameter 176 is illustrated herein as being smaller than the aft shank diameter 180. A head 174 of the threaded sleeve 160 provides anti-rotation for the collar 121. The threaded sleeve 160 includes internal threads 161 which are threaded onto mid-span external threads 170 on the collar studs 120. FIG. 10 also illustrates a collar stud joint 119 in which the threaded collar studs 120 are threaded into flange threads 144 within the flange bolt holes 100 in the forward flange 90.

Figure 11:
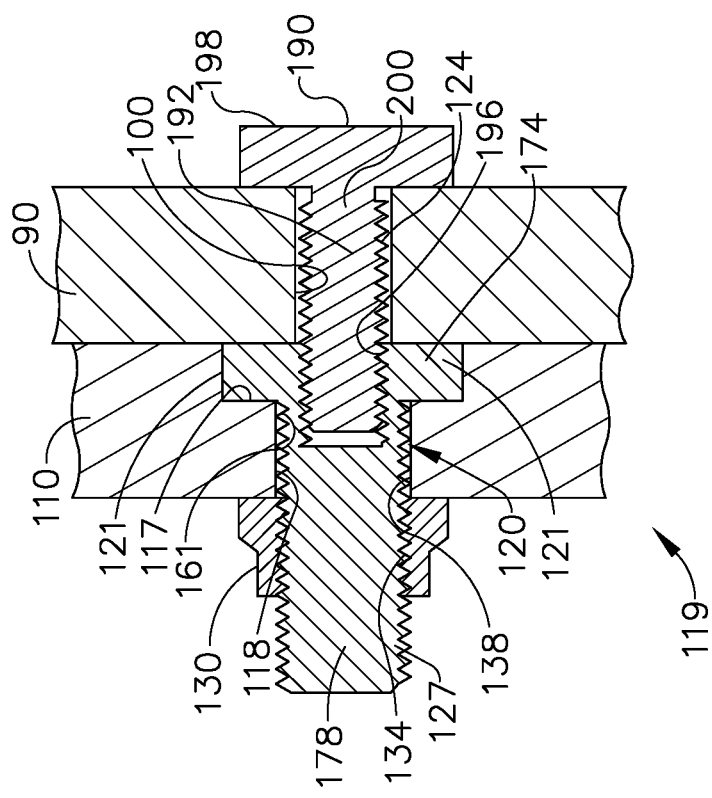
FIG. 11 is a cross-sectional diagrammatical view illustration of the spinner push out stud joint illustrated in FIG. 1 with a two piece collar stud.

FIG. 11 illustrates yet another embodiment of the collar stud joint 119 which incorporates a two piece collar stud 120. The two piece collar stud 120 includes a shank 178 disposed through a bolt hole 118 extending through the boss 110 of the spinner 104. The shank 178 includes an internally threaded collar 121 at an aft end 156 of the shank 178. The two piece collar stud 120 further includes a joint bolt 190 having a joint shank 192 disposed through the flange bolt hole 100 in the forward flange 90. Aft stud threads 124 on the joint shank 192 are threaded into internal collar threads 196 in the internally threaded collar 121. The joint bolt 190 further includes a shank head 198 at an aft end 200 of the joint shank 192 which presses up against the forward flange 90 around the flange bolt hole 100. The forward nut 130 is threaded on the forward stud threads 134 on the forward end 127 of the shank 178 and the collar stud 120. The forward nut 130 abuts and engages the spinner 104 and, more particularly, the bosses 110 of the spinner 104.

Figure 12:
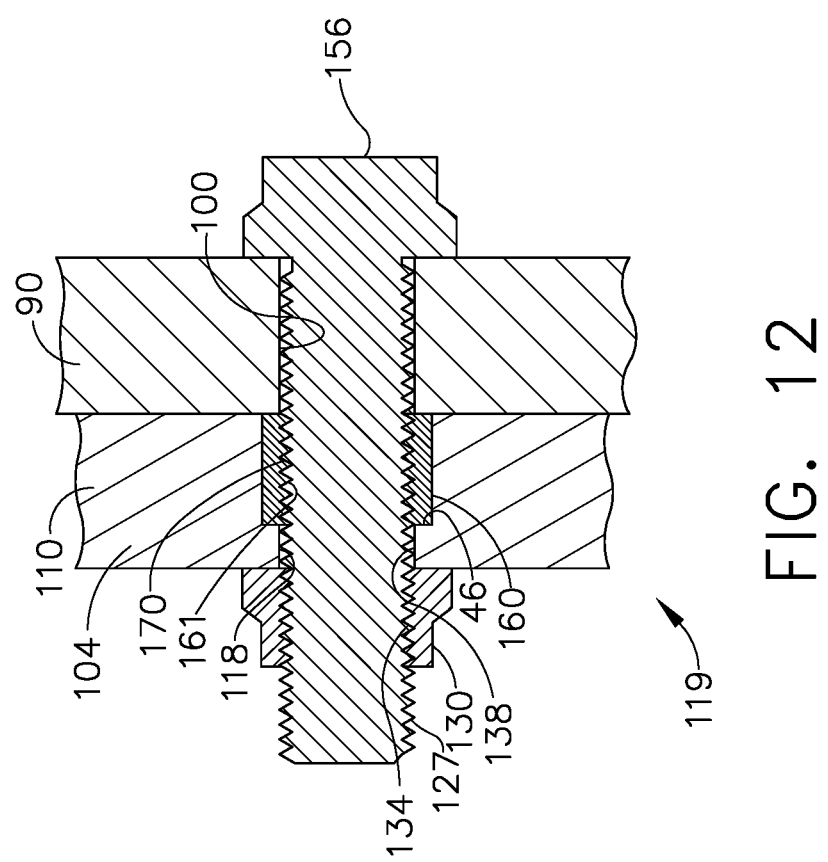
FIG. 12 is a cross-sectional diagrammatical view illustration of the spinner push out stud joint illustrated in FIG. 1 with a stepped stud.

FIG. 12 illustrates a threaded collar stud 120 with a stepped stud 210 with a shank 178 having different forward and aft shank diameters 176, 180 along forward and aft portions 182, 184 of the shank 178 and the stepped stud 210. The forward portion 182 aftwardly extends from the forward end 127 of the stepped stud 210 through the spinner bolt hole 118 in the boss 110 and the spinner 104. The aft portion 184 aftwardly extends from the forward portion 182 through the flange bolt hole 100 in the forward flange 90. The forward shank diameter 176 is illustrated herein as being smaller than the aft shank diameter 180.

Figure 13:
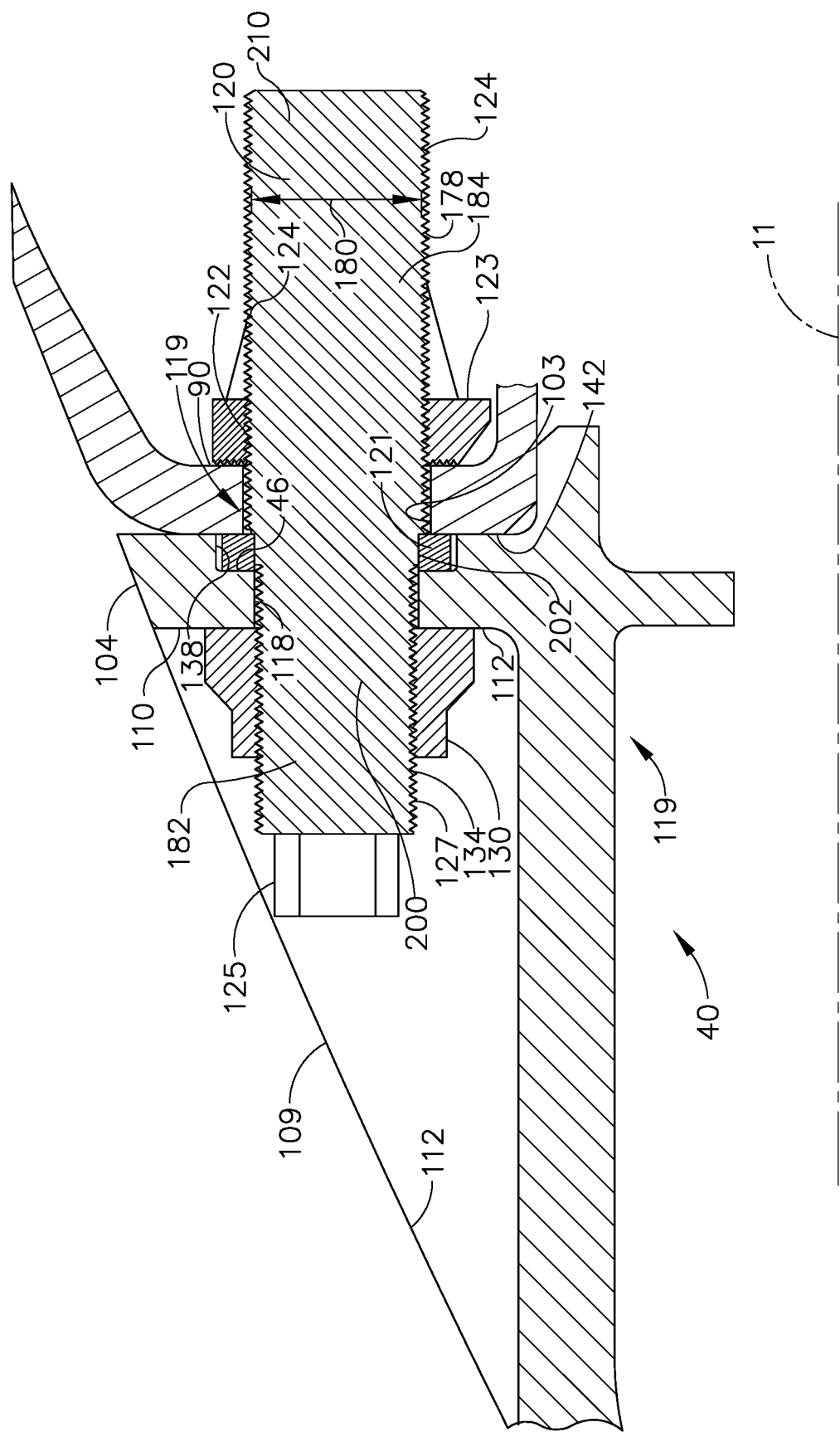
FIG. 13 is a cross-sectional diagrammatical view illustration of the spinner push out stud joint illustrated in FIG. 1 with a stepped and collared stud.

FIG. 13 illustrates a spinner push out stud joint 102 which is a collar stud joint 119. The collar stud 120 is a stepped stud 210 with a shank 178 having different forward and aft shank diameters 176, 180 along forward and aft portions 182, 184 of the shank 178 and the stepped stud 210. The forward portion 182 aftwardly extends from the forward end 127 of the stepped stud 210 through the spinner bolt hole 118 in the boss 110 and the spinner 104. The aft portion 184 aftwardly extends from the forward portion 182 through the flange bolt hole 100 in the forward flange 90. The aft portion 184 is threaded into aft nuts 122 in the annular forward flange 90 with aft stud threads 124 on the aft portion 184. Collars 121 may surround but are not attached to an aft end of the forward portion 182. The aft nuts 122 may be shank nuts which provide anti-rotation for the aft nuts 122 which are swaged into the flange bolt holes 100 in the forward flange 90. The aft nuts 122 may be D-head nuts 123. The stepped stud 210 may have multifaceted heads 125, such as hex heads, on forward ends 127 of the stepped stud 210 which may be used to torque and rotate the stepped stud 210 when threading the stepped stud 210 into the aft nuts 122. Forward nuts 130 are threaded onto forward stud threads 134 on the forward portion 182 of the stepped stud 210.

The collars 121 may abut and engage the spinner 104 and, more particularly, the bosses 110 of the spinner 104. This secures the spinner 104 to the annular forward flange 90 and the disk 13. The collars 121 surround the stepped studs 210 and seat within the counterbores 117 between the bosses 110 and the forward flange 90. The collars 121 may be located around a smooth un-threaded portion 202 of an aft end 200 of the forward portion 182 of the stepped stud 210 and aft of the forward stud threads 134 on the forward portion 182. In the assembled condition, the collars 121 butt against aft flange face 142 of the annular forward flange 90 or aft support ring (ASR). During disassembly of the spinner 104 from the ASR, the stepped studs 210 are unthreaded from the forward flange 90 or aft support ring (ASR) and the collars 121 push against the annular shoulder 46 between the counterbore 117 and the spinner bolt holes 118 in the spinner boss 110 of the spinner 104. This pushes the spinner 104 out from the flange bore 103 and away from the flange 90 when the stepped studs 210 are un-torqued.

A washer 136 may be disposed in the counterbore 117 between the collar 121 and the boss 110 on the spinner 104. The washer 136 may be made from a low friction and/or sacrificial material to prevent or reduce surface wear during disassembly. A forward radial clearance 138 may surround the washer 136 between the washer and the bosses 110 of the spinner 104.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. An aircraft gas turbine engine spinner assembly comprising: a spinner push out stud joint connecting a spinner to a forward flange connected to a fan rotor disk, the spinner including a radially inner flange spaced radially inwardly of a hollow shell of the spinner, the radially inner flange disposed in a forward flange bore within the forward flange, the spinner push out stud joint including a threaded stud operable for securing the spinner to the forward flange and pushing out the spinner from the forward flange bore and away from the forward flange when the threaded stud is un-torqued, wherein the spinner push out stud joint is a collar stud joint and the threaded stud is a collar stud, the collar stud joint including a collar attached to and surrounding the collar stud, the collar stud disposed through a spinner bolt hole in the spinner and the collar disposed in a counterbore of the spinner bolt hole extending axially forward into the spinner.

2. The assembly as claimed in claim 1 further comprising aft stud threads on the collar stud, the aft stud threads being threaded into an aft nut in the forward flange.

3. The assembly as claimed in claim 2 further comprising the aft nut swaged into a forward flange bolt hole in the forward flange.

4. The assembly as claimed in claim 2 further comprising a multifaceted head on or a key hole through a forward end of the collar stud.

5. The assembly as claimed in claim 2 further comprising a washer disposed in the counterbore between the collar and the spinner wherein the washer is made from a low friction and/or sacrificial material.

6. The assembly as claimed in claim 2 further comprising a forward radial clearance surrounding the collar stud between the collar stud and the spinner.

7. The assembly as claimed in claim 2 further comprising a forward nut threaded onto forward stud threads on a forward end of the collar stud and abutting the spinner.

8. The assembly as claimed in claim 7 further comprising external aft stud threads on the collar stud, the external aft stud threads being threaded into internal forward flange threads within the forward flange bolt hole in the forward flange.

9. The assembly as claimed in claim 8 further comprising a forward radial clearance surrounding the collar stud between the collar stud and the spinner and/or a washer disposed in the counterbore between the collar and the spinner wherein the washer is made from a low friction and/or sacrificial material.

10. The assembly as claimed in claim 9 further comprising a multifaceted head on or a key hole through a forward end of the collar stud.

11. The assembly as claimed in claim 7 further comprising an aft nut threaded onto external aft stud threads on the collar stud and the aft nut abutting the forward flange around a forward flange bolt hole in the forward flange.

12. The assembly as claimed in claim 11 further comprising forward and aft radial clearances surrounding the collar stud between the collar stud and the spinner in the spinner bolt hole and between the collar stud and the forward flange in the forward flange bolt hole.

13. The assembly as claimed in claim 11 further comprising a multifaceted head on or a key hole through a forward end of the collar stud.

14. The assembly as claimed in claim 1 wherein the collar stud joint further includes an internally threaded sleeve threaded on the collar stud, the collar including a head of the sleeve, and internal threads of the sleeve threaded onto mid-span external threads on the collar stud.

15. The assembly as claimed in claim 14 further comprising: forward and aft nuts threaded onto forward and aft stud threads on forward and aft ends of the collar stud, the forward nut abutting and engaging the spinner, and the aft nut abutting and engaging the forward flange around a forward flange bolt hole in the forward flange.

16. The assembly as claimed in claim 15 further comprising the head of the threaded sleeve being square and sized for providing anti-rotation for the collar.

17. The assembly as claimed in claim 15 further comprising forward and aft radial clearances surrounding the collar stud between the collar stud and the spinner in the spinner bolt hole and between the collar stud and the forward flange in the forward flange bolt hole.

18. The assembly as claimed in claim 15 further comprising a multifaceted head on or a key hole through a forward end of the collar stud.

19. The assembly as claimed in claim 1 wherein the collar stud joint includes different forward and aft shank diameters along forward and aft portions respectfully of the collar stud, the forward portion aftwardly extending from a forward end of the collar stud through the spinner, and the aft portion aftwardly extending from the forward portion through the forward flange.

20. The assembly as claimed in claim 19 further comprising the forward shank diameter being smaller than the aft shank diameter.

21. The assembly as claimed in claim 19 wherein the collar stud joint includes an internally threaded sleeve threaded on the collar stud, the collar including a head of the sleeve, and internal threads of the sleeve threaded onto mid-span external threads on the collar stud.

22. The assembly as claimed in claim 21 further comprising: forward and aft nuts threaded onto forward and aft stud threads on forward and aft ends of the collar stud, the forward nut abutting and engaging the spinner, and the aft nut abutting and engaging the forward flange around a forward flange bolt hole in the forward flange.

23. The assembly as claimed in claim 1 wherein the collar stud joint includes a shank disposed through the spinner bolt hole extending through the spinner, an internally threaded collar at an aft end of the shank, a joint bolt having a joint shank disposed through a forward flange bolt hole in the forward flange, aft stud threads on the joint shank threaded into internal collar threads in the internally threaded collar, and a shank head at an aft end of the shank pressing against the forward flange around a forward flange bolt hole in the forward flange.

24. The assembly as claimed in claim 23 further comprising a forward nut threaded onto forward stud threads on a forward end of the collar stud and abutting the spinner.

25. The assembly as claimed in claim 1 further comprising the spinner bolt hole extending through a boss of the spinner.

26. The assembly as claimed in claim 14 further comprising the spinner bolt hole extending through a boss of the spinner.

27. An aircraft gas turbine engine spinner assembly comprising: a spinner push out stud joint connecting a spinner to a forward flange connected to a fan rotor disk, the spinner including a radially inner flange spaced radially inwardly of a hollow shell of the spinner, the radially inner flange disposed in a forward flange bore within the forward flange, the spinner push out stud joint including a threaded stud operable for securing the spinner to the forward flange and pushing out the spinner from the forward flange bore and away from the forward flange when the threaded stud is un-torqued, the spinner push out stud joint being a collar stud joint and the threaded stud is a collar stud, the collar stud being a stepped stud with a shank having different forward and aft shank diameters along forward and aft portions of the shank, a collar surrounding an aft end of the forward portion or surrounding and attached to an aft end of the forward portion, the forward portion disposed through a spinner bolt hole in the spinner, and the collar disposed in a counterbore of the spinner bolt hole extending axially forward into the spinner.

28. The assembly as claimed in claim 27 further comprising an aft stud thread on the collar stud threaded into an aft nut in the forward flange.

29. The assembly as claimed in claim 28 further comprising a washer disposed in the counterbore between the collar and the spinner wherein the washer is made from a low friction and/or sacrificial material.

30. The assembly as claimed in claim 28 further comprising a forward nut threaded onto forward stud threads on the forward portion.

31. An aircraft gas turbine engine spinner assembly comprising: a spinner push out stud joint connecting a spinner to a forward flange connected to a fan rotor disk, the spinner including a radially inner flange spaced radially inwardly of a hollow shell of the spinner, the radially inner flange disposed in a forward flange bore within the forward flange, the spinner push out stud joint including a threaded stud operable for securing the spinner to the forward flange and pushing out the spinner from the forward flange bore and away from the forward flange when the threaded stud is un-torqued, the threaded stud being disposed through a spinner bolt hole in the spinner and through a forward flange bolt hole in the forward flange, an annular internally threaded sleeve threaded onto the threaded stud and disposed through the spinner bolt hole in the spinner, the threaded sleeve including internal threads threaded onto mid-span external threads on the threaded stud, and the internal threads threaded in an opposite direction to that of the forward and aft stud threads on the threaded stud, and the annular internally threaded sleeve disposed in a counterbore of the spinner bolt hole extending axially forward into the spinner.

32. The assembly as claimed in claim 31 further comprising: forward and aft nuts threaded onto forward and aft stud threads on forward and aft ends of the threaded stud, the forward nut abutting and engaging the spinner, and the aft nut abutting and engaging the forward flange around the forward flange bolt hole.

\* \* \* \* \*